United States Patent
Schumacher et al.

(10) Patent No.: US 7,438,338 B1
(45) Date of Patent: Oct. 21, 2008

(54) MULTI-POSITIONAL STORAGE ARRANGEMENT FOR A SPORT UTILITY OR OTHER VEHICLE

(75) Inventors: Christopher R. Schumacher, Frederick, CO (US); Richard C. Essig, Berthoud, CO (US); Ronald S. Dahms, Westminster, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 11/836,591

(22) Filed: Aug. 9, 2007

(51) Int. Cl.
B60R 5/04 (2006.01)
(52) U.S. Cl. .................. 296/37.6; 296/37.16; 222/404
(58) Field of Classification Search ............... 296/37.6, 296/37.16, 24.31, 24.4, 24.743, 24.44, 24.45; 224/403, 404
See application file for complete search history.

(56) References Cited

U.S. PATENT DOCUMENTS

| | | | |
|---|---|---|---|
| 4,938,519 | A | 7/1990 | Schlachter |
| D321,159 | S | 10/1991 | Schlachter |
| 5,324,089 | A | 6/1994 | Schlachter |
| 5,498,049 | A | 3/1996 | Schlachter |
| 5,564,776 | A | 10/1996 | Schlachter |
| 5,598,962 | A | 2/1997 | Schlachter |
| 5,957,521 | A | 9/1999 | Schlachter |
| 5,992,719 | A | 11/1999 | Carter, III |
| D420,969 | S | 2/2000 | Schlachter |
| 6,065,794 | A | 5/2000 | Schlachter |
| 6,082,804 | A | 7/2000 | Schlachter |
| 6,106,044 | A | 8/2000 | Schlachter |
| 6,170,724 | B1 | 1/2001 | Carter et al. |
| 6,607,228 | B2 | 8/2003 | Carter, III et al. |
| 6,959,955 | B2 | 11/2005 | Carter, III et al. |

OTHER PUBLICATIONS

Bestop, Inc., Instatrunk Installation Instructions, pp. 1-4, Rev. 3 0306.
Bestop, Inc., Extendatrunk XL Installation Instructions, pp. 1-5, Rev. B 0906.
Bestop, Inc., Extendatrunk XL Installation Instruction, pp. 1-4, 0804 Rev. A.

*Primary Examiner*—Joseph D Pape
(74) *Attorney, Agent, or Firm*—W. Scott Carson

(57) ABSTRACT

A multi-positionable storage arrangement with removable front and top panels that can be configured in a number of ways between two side panels to form a variety of both secured and open storage spaces. In the preferred configurations, the front, top, and side panels of the arrangement combine with the rear deck and tailgate of the vehicle to enclose a securable storage space. In use, the front panel can be slid substantially vertically into one of three sets of grooves in the side panels. One or more of the top panels can thereafter be slid horizontally in grooves in the side panels until the forward most top panel abuts and overlaps the front panel. The closed tailgate then abuts the rearward most top panel securing the top and front panels in place. Additional grooves are provided in the side panels immediately adjacent the front panel and when not in use, the three top panels can be conveniently and compactly stored immediately adjacent the front panel and each other.

34 Claims, 13 Drawing Sheets

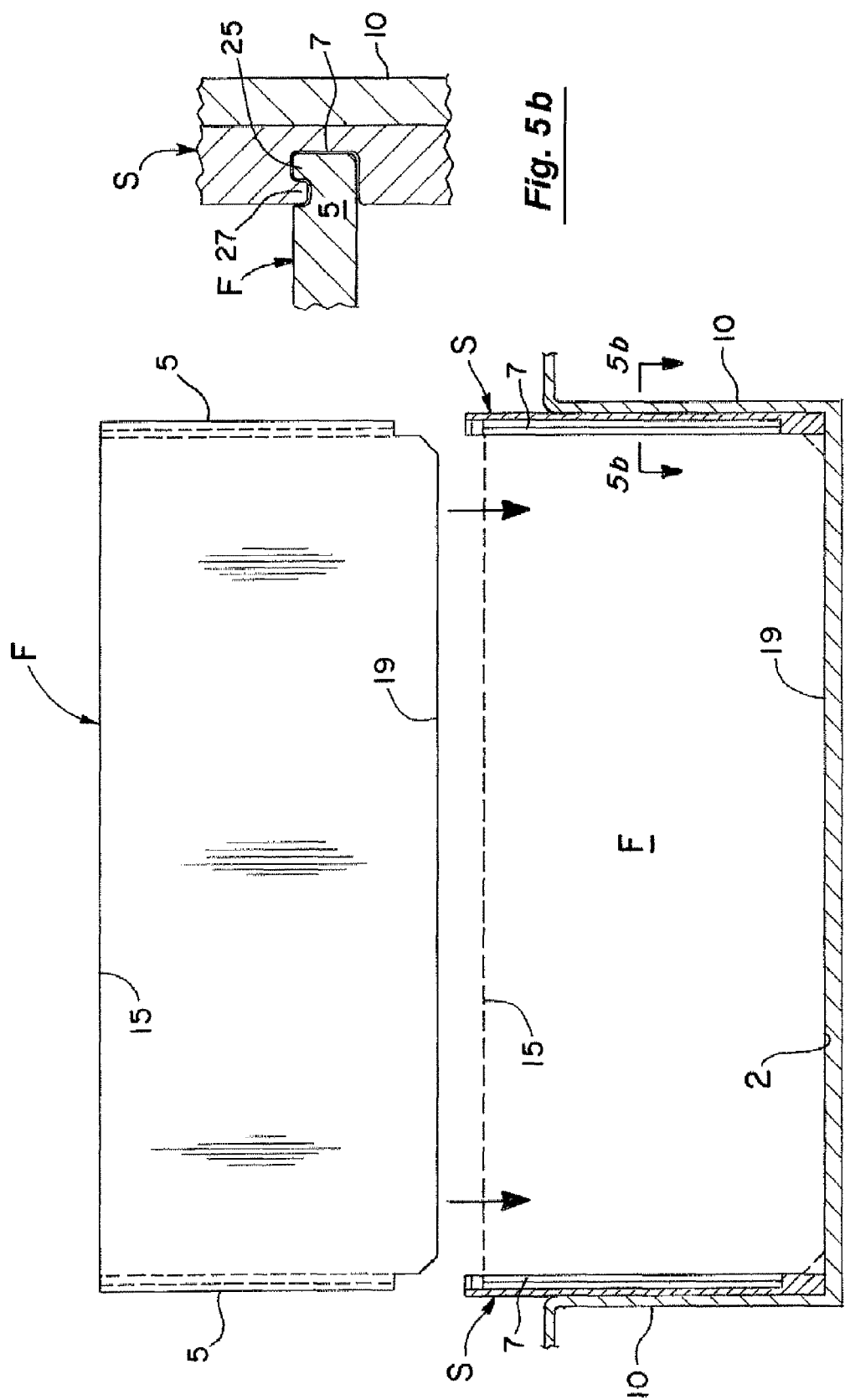

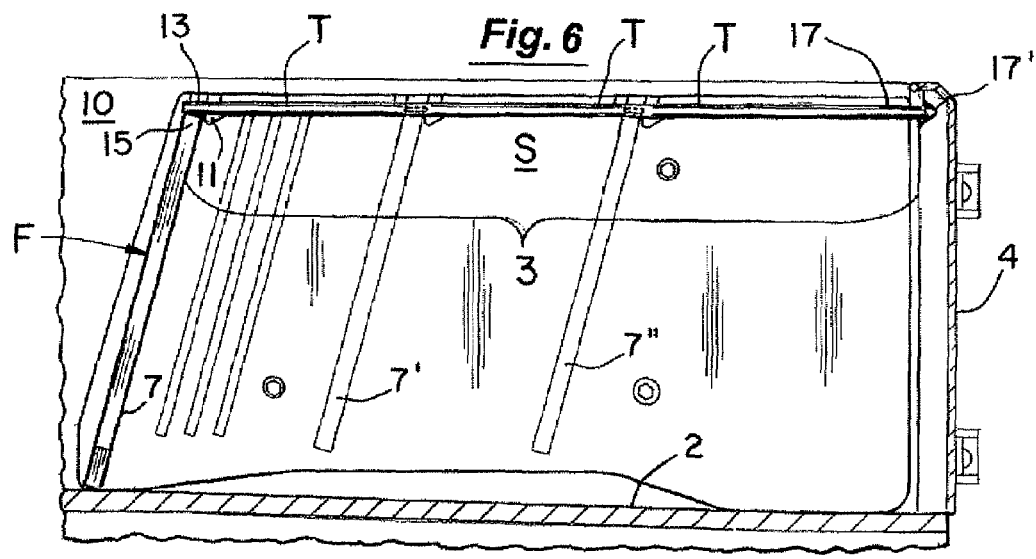
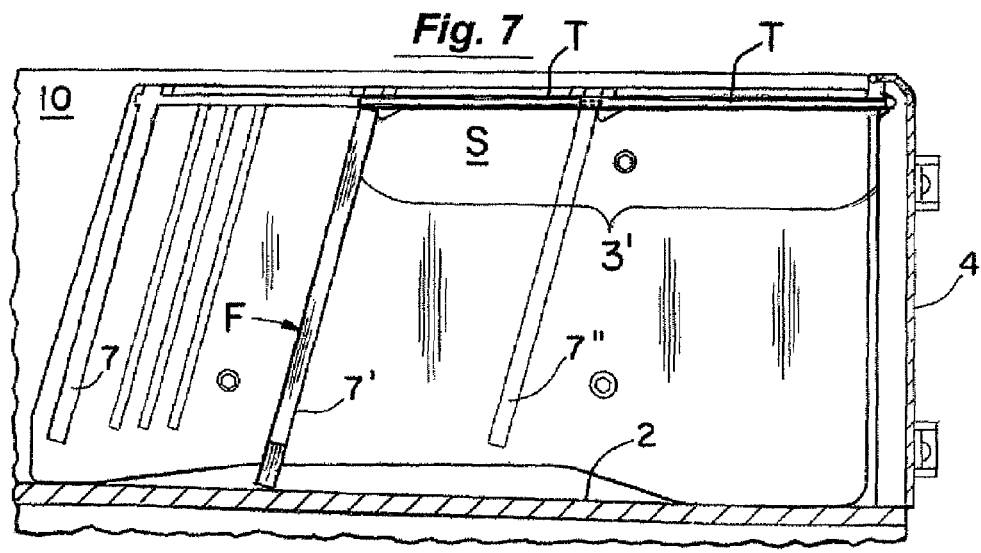
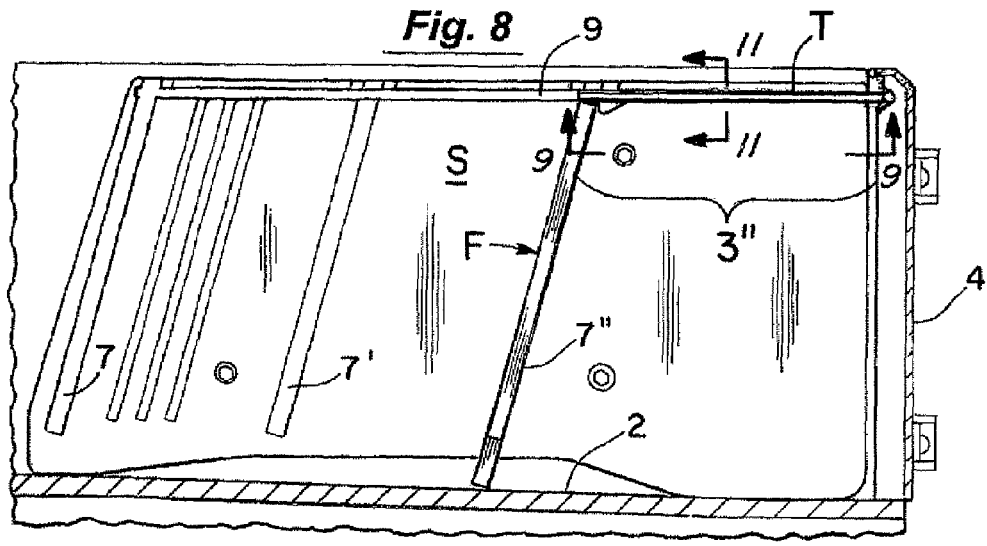

MULTI-POSITIONAL STORAGE ARRANGEMENT FOR A SPORT UTILITY OR OTHER VEHICLE

BACKGROUND OF THE INVENTION

1. Field of the Invention

This invention relates to the field of storage arrangements for sport utility and similar vehicles and more particularly to the field of such arrangements that can be configured in a variety of different ways to form a number of variously sized storage spaces.

2. Discussion of the Background.

Many sport utility and similar vehicles are widely popular in part because they offer an open air experience in which the top or other accessories can be removed.

However, in doing so, the security of the interior of the vehicle is essentially eliminated and items (e.g., camping gear, tools, and personal valuables) cannot be safely stored and left unattended in the vehicle. Vehicles with soft tops are additionally vulnerable even with the soft top in place as the vinyl or canvas top normally can be relatively easily broken into or at least partially removed to access the vehicle interior.

Securable storage arrangements are available for such vehicles but for the most part are usually fixed in place or do not provide a variety of storage configurations. The ones that are fixed in place are typically designed intentionally to be difficult to remove and do not offer the user the option of easily and quickly dismantling them if full access to the vehicle is desired. Other arrangements that can be configured in a number of ways often lack the ability to provide a securable space and the movable parts often cannot be conveniently and compactly stored on the vehicle when not in use.

With this and other problems in mind, the present invention was developed. In it, a multi-positional storage arrangement is provided which can be easily and quickly configured in a number of ways to form a variety of both secured and open storage spaces of a various sizes. The parts of the arrangement can also be conveniently and compactly stored on the vehicle when not in use.

SUMMARY OF THE INVENTION

This invention involves a multi-positionable storage arrangement in which removable front and top panels can be configured in a number of ways between two side panels to form a variety of both secured and open storage spaces. The storage arrangement is adaptable to both two and four door vehicles and can be used with the seats in place, folded, or removed. In the preferred configurations, the front, top, and side panels of the arrangement combine with the rear deck and tailgate of the vehicle to enclose a securable storage space. The tailgate is mounted for pivotal movement between an open position permitting access to the space and a closed position preventing access. The tailgate in this regard forms the last wall of the storage space with the front, top, and side panels and the vehicle deck being the other ones.

In use, the front panel can be slid substantially vertically into place in grooves in the side panels. The top panels can thereafter be slid horizontally in grooves in the side panels until the forward most top panel abuts the front panel. In this abutting position, the forward edge of the top panel overlaps the upper edge of the front panel and prevents it from being moved or lifted up. The top panels in turn abut one another with the closed tailgate abutting the rearward most top panel and securing the top panels and front panel in place. Additional grooves are provided in the side panels immediately adjacent the front panel and when not in use, the three top panels can be conveniently and compactly stored immediately adjacent the front panel and each other.

The front panel can be moved to a number of positions closer to the tailgate to form progressively smaller storage spaces. In one alternative configuration, the front panel is received in another set of substantially vertical grooves in the side panels closer to the tailgate.

In this configuration, only two top panels are then needed with the forward most top panel abutting and overlapping the front panel and the second top panel abutting the closed tailgate. In a third configuration, the front panel is moved even closer to the tailgate and only one top panel is necessary to form the secured storage space.

With the second and third configurations, the top panel or panels not in use to form the secured space can be placed in the open vertical grooves. The top panel or panels then can serve as a divider or dividers forming one or more open storage compartments forward of the secured space. Valuable camping gear, tools, and personal items can then be placed in the securable storage space and other items can be placed or organized as desired in the easily accessible, open storage compartments. The top panels not in use can also be positioned if desired in additional horizontal grooves in the side panels within the securable storage space to serve as shelves.

BRIEF DESCRIPTION OF THE DRAWINGS

FIG. 5a is a view taken along line 5a-5a of FIG. 5.

FIG. 5b is a view taken along line 5b-5b of FIG. 5a.

FIGS. 6-8 illustrate various configurations in which the front and top panels can be positioned to make progressively smaller, secured storage spaces.

DETAILED DESCRIPTION OF THE INVENTION

Figure 1:
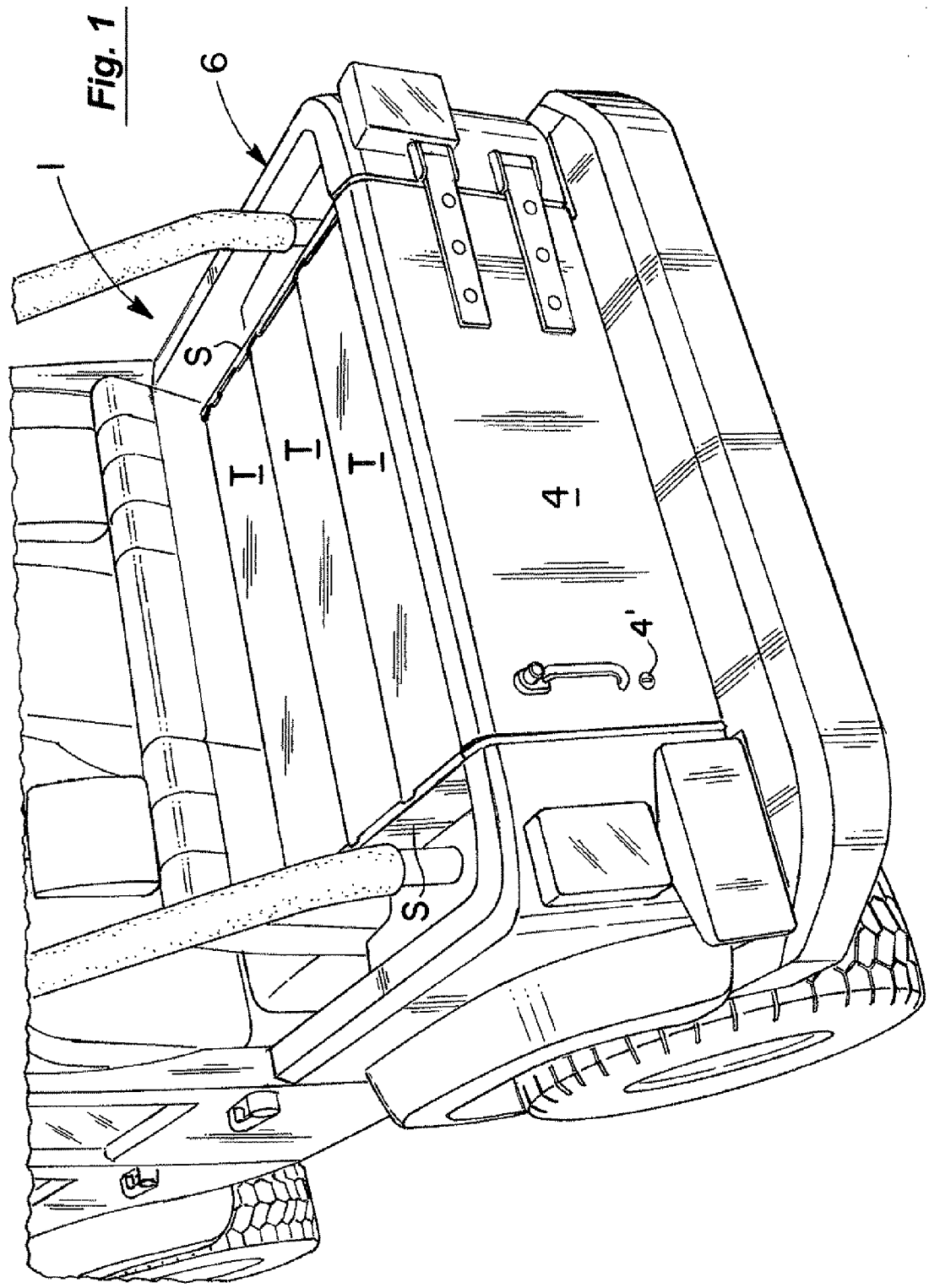
FIG. 1 is a rear perspective view of one configuration of the multi-positionable storage arrangement of the present invention.
Figure 2:
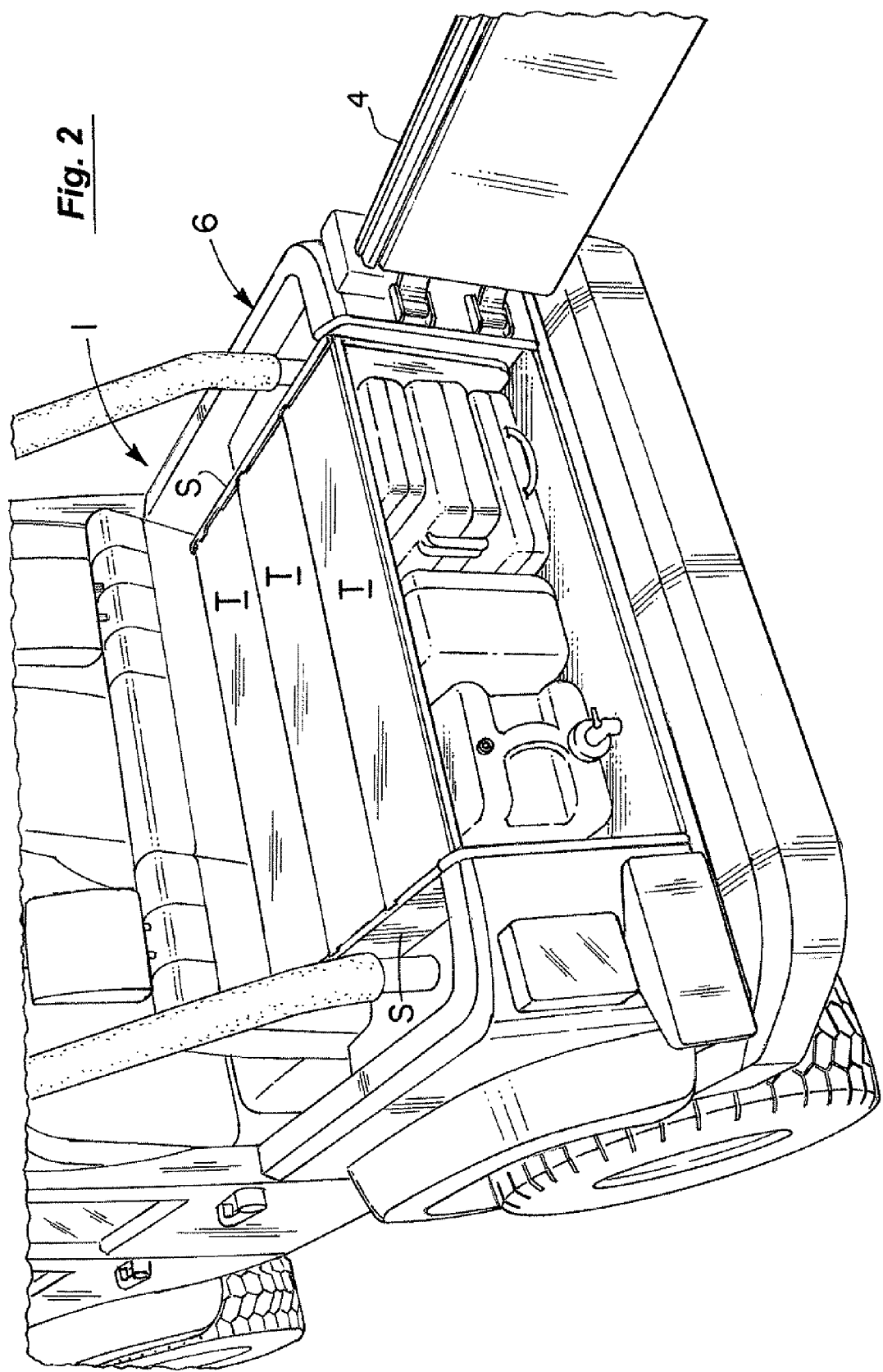
FIG. 2 is a view of the configuration of FIG. 1 with the tailgate shown in an open position providing access to the stored items.
Figure 3:
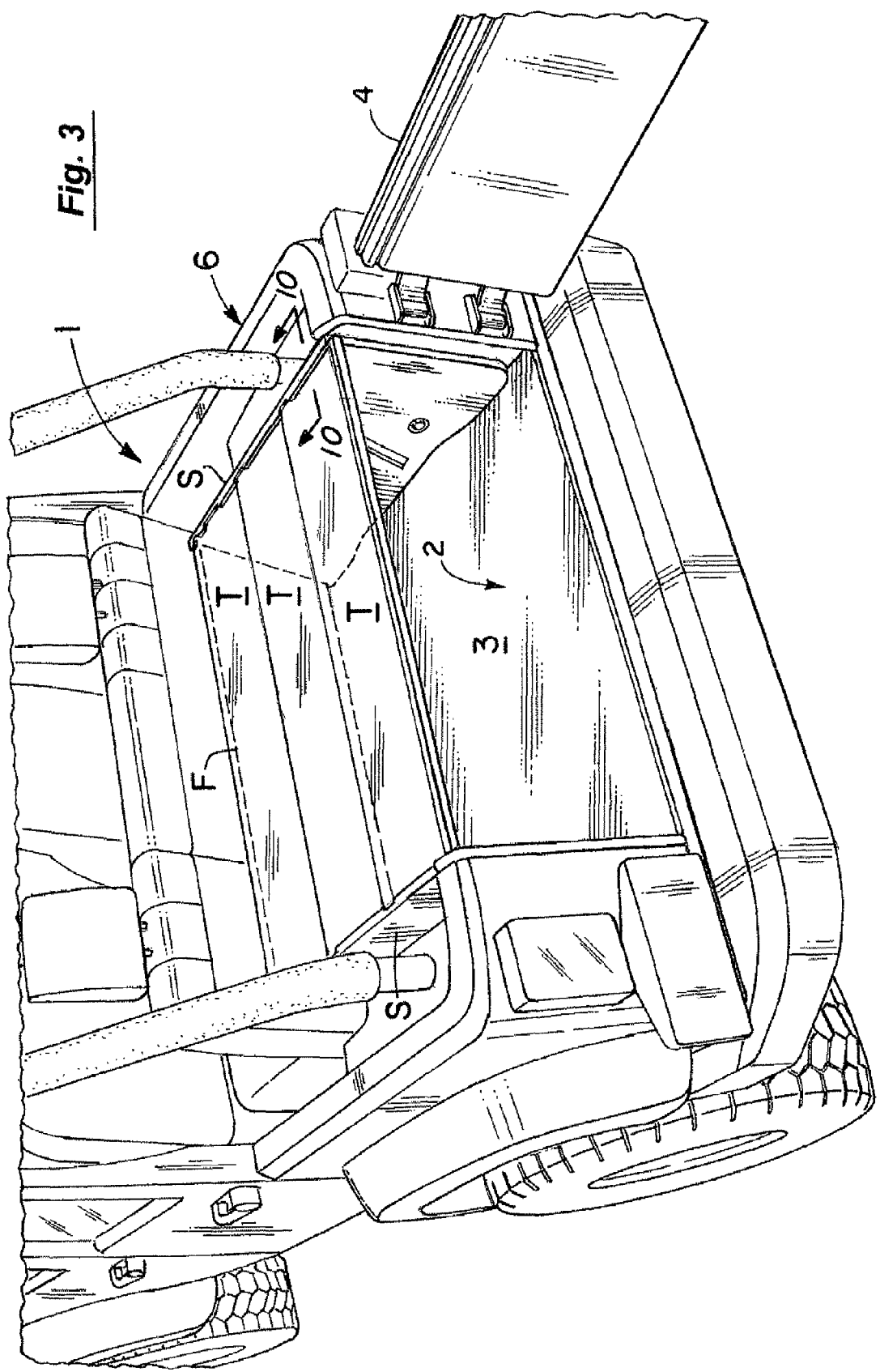
FIG. 3 is a view similar to FIG. 3 with the stored items removed for clarity.
Figure 4:
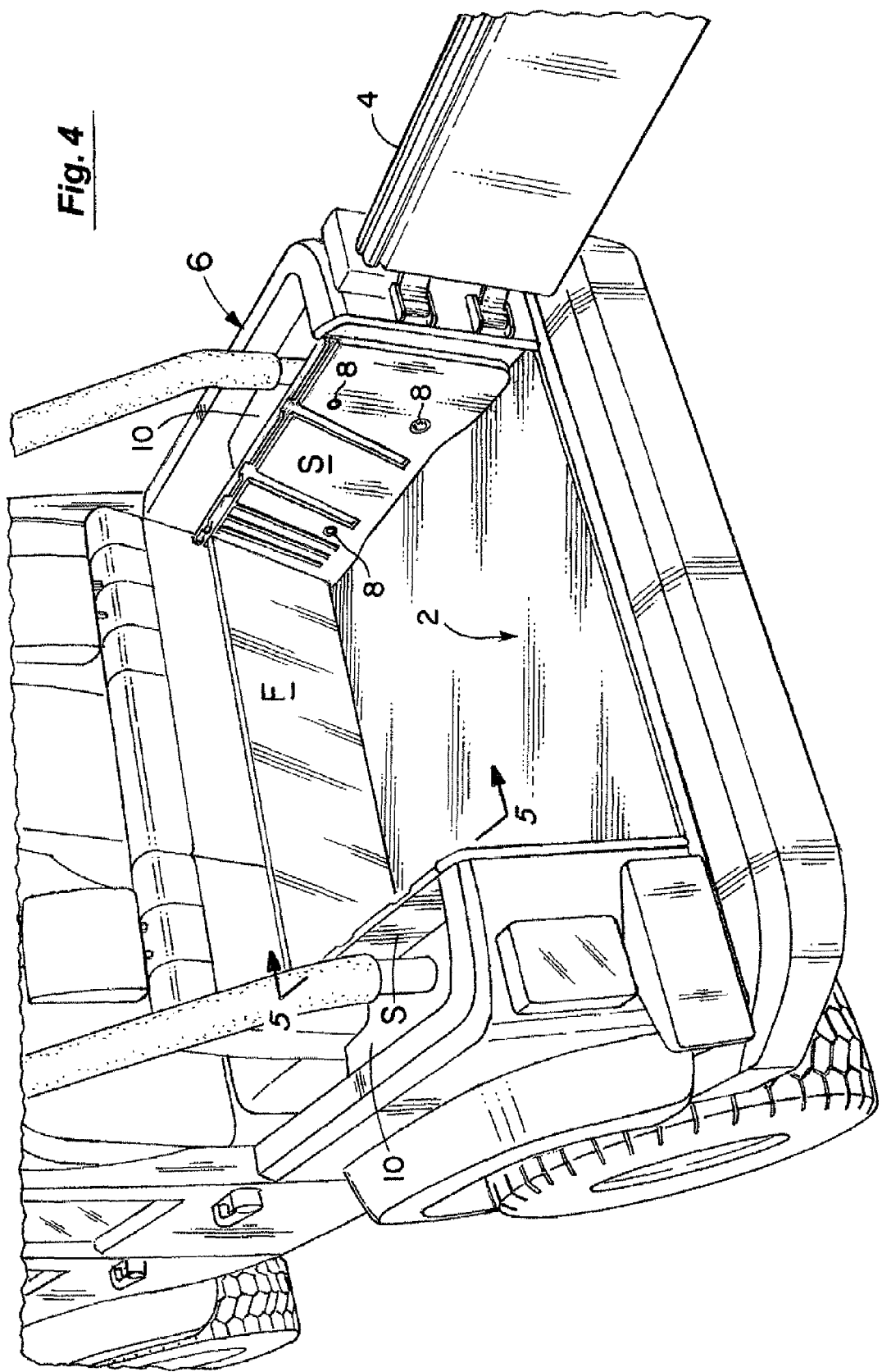
FIG. 4 is a rear perspective view with the top panels removed.

The multi-positionable storage arrangement 1 of the present invention is shown in FIGS. 1-3 in a first configuration. In this configuration, three top panels T of the storage arrangement 1 are positioned between side panels S (see FIG. 3). The top panels T as shown extend rearwardly of the front panel F (FIGS. 3 and 4). The storage arrangement 1 of this configuration then forms a storage space 3 (FIG. 3) which is defined by the front, side, and top panels F, S, and T of the storage arrangement 1 and the rear deck 2 and tailgate 4 of the vehicle 6. The tailgate 4 in this regard is mounted as illustrated for pivotal movement between the closed position of FIG. 1 and the open position of FIGS. 2 and 3. In the closed position of FIG. 1, the tailgate 4 (which is lockable at 4') forms the sixth or last wall of the space 3 of FIG. 3 serving to enclose and prevent access to the space 3. In contrast and in the open position of FIG. 3, the tailgate 4 permits or allows access to the space 3 and any items (see FIG. 2) therein.

The storage arrangement 1 of the present invention is multi-positionable as indicated above.

In this regard, the individual panels F and T can be moved or located as desired in the configurations of FIGS. 6-8 to form the variously sized, secured storage spaces 3, 3', and 3". In the first configuration of FIG. 6, the panels F and T are located to form the largest secured space 3. To form this space 3, the side panels S are securely mounted in place to the vehicle side walls 10 (e.g., by carriage bolts 8 as in FIGS. 4 and 5 into the wheel wells of the vehicle side walls 10). The vehicle side walls 10 as shown (see FIG. 4) are horizontally spaced laterally apart from each other and extend upwardly from adjacent the vehicle rear deck 2. Once the side panels S are secured in place, the side edge portions 5 (see FIGS. 5 and 5a) of the front panel F can then be received and slid downwardly into the vertically extending grooves 7 of the side panels S. The top panels T in FIG. 5 can thereafter be received and slid forwardly into the horizontally extending grooves 9 of the side panels S. The grooves 7 receiving the front panel F extend upwardly of the rear deck 2 as shown and are substantially aligned with each other across the rear deck 2 as are the horizontally extending grooves 9.

Figure 5:
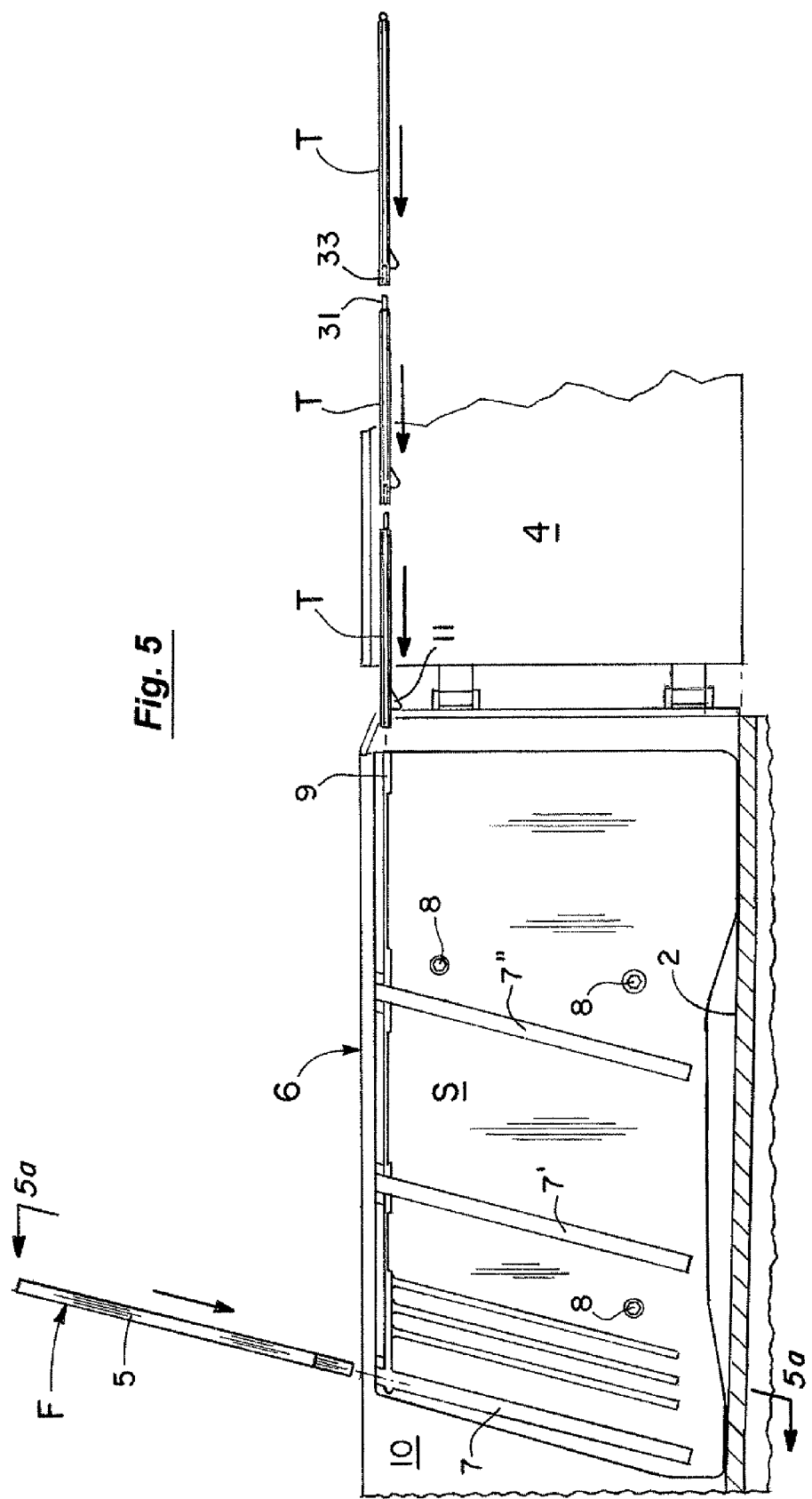
FIG. 5 is a view taken along line 5-5 of FIG. 4 with the removable front and top panels in positions ready to be moved to form the first storage configuration of FIGS. 1-3.

The top panels T are slid forwardly in FIG. 5 until the depending stop member 11 of the forward most panel T (the one farthest to the left in FIGS. 5 and 6) abuts the front panel F. In this position as shown in FIG. 6, the forward edge portion 13 of the forward most panel T preferably overlaps the upper edge portion 15 of the front panel F. In this manner and with the edge portion 13 of the forward most panel T overlapping the upper edge portion 15 of the front panel F (FIG. 6), the front panel F is prevented from being moved or slid upwardly and is thereby maintained in place. The tailgate 4 can subsequently be closed as in FIG. 6 to abut the rearward edge portion 17 of the rearward most top panel T (farthest to the right in FIG. 6) to securely hold the three top panels T in place. The rearward most top panel T in this regard preferable has a flexible seal 171 extending therealong that abuts against the closed tailgate 4 to aid in sheltering the enclosed storage space 3 from the elements (e.g., rain).

To selectively adjust the size of the secured storage space 3 of FIG. 6, the front panel F can be moved from the forward grooves 7 of FIG. 6 to the middle grooves 71 of FIG. 7. Two of the top panels T of FIG. 6 can then be slid horizontally in place as in FIG. 7 to form the mid-sized storage space 3'. Similarly, the front panel F can be moved to the rear grooves 7" as in FIG. 8 and one of the top panels T slid into place to form the smaller storage space 3" of FIG. 8.

In the configurations of FIGS. 6-8, the side panels S as previously noted are laterally spaced apart from each other and mounted to the vehicle side walls 10 as discussed above. The substantially vertical side panels S preferably extend up from adjacent the substantially horizontal rear deck 2 of the vehicle 6 with as little or no space therebetween. Similarly, the front panel F as shown in FIG. 5a preferably extends up from the rear deck 2 with as little or no space between the bottom edge portion 19 of the panel F and the rear deck 2.

In this manner, the enclosed space 3 of FIGS. 1 and 6 and the spaces 3' and 3" of FIGS. 7 and 8 are as secure as possible and as sheltered from the elements (e.g., rain) as possible.

Figure 9:
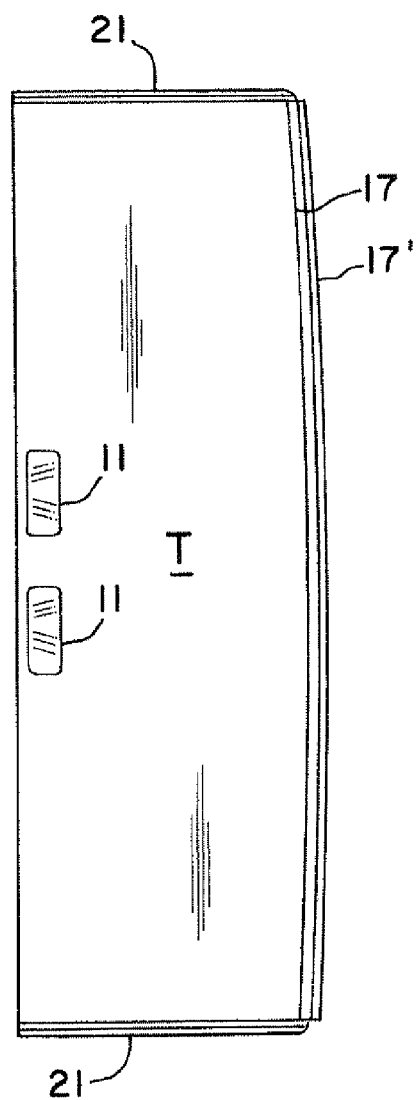
FIG. 9 is an underneath view of one of the top panels taken along ling 9-9 of FIG. 8.
Figure 10:
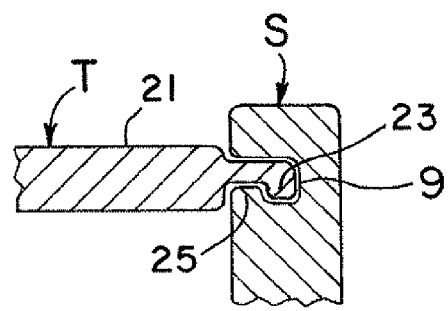
FIG. 10 is a cross sectional view taken along line 10-10 of FIG. 3 showing the interlocking members between the top and side panels.
Figure 11:
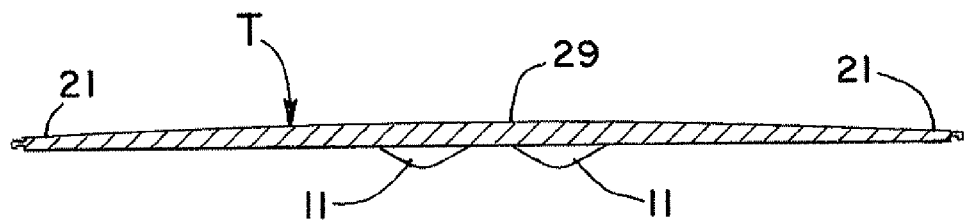
FIG. 11 is a view taken along line 11-11 of FIG. 8 showing a modified top panel with a crowned upper surface.

As discussed above and as also shown in the underneath view of FIG. 9, at least one of the top panels T and preferably all three have one or more depending stop members 11. These stop members 11 as also discussed above serve to abut against the front panel F (regardless of the configuration of FIGS. 6-8) adjacent the upper edge portion 15 of the front panel F. The stop members 11 preferably abut the front panel F substantially midway between the side edge portions 5 of the front panel F. In this abutting position as noted above, the forward edge portion 13 of the top panel T (see FIG. 6) overlaps the upper edge portion 15 of the front panel F and aids in forming a secure storage space 3. The same is true in the other configurations including those of FIGS. 7 and 8. Additionally, the side edge portions 21 of the top panels T and the horizontal grooves 9 of the side panels S (see FIGS. 8-10) preferably form a set of interlocking members 23 and 25. The interlocking members 23 and 25 in this regard prevent the top panels T from being removed laterally from between the side panels S. Similarly, the side edge portions 5 of the front panel F and the grooves 7, 7', and 7" of the side panels S preferably also form a set having interlocking members 25 and 27 as illustrated in FIG. 5b. For additional strength and appearance and to aid in shedding water, the upper surface 29 of the top panels T can be crowned if desired (FIG. 11) between the side edge portions 21. The abutting top panels T as perhaps best seen in FIG. 5 can also have mating tongues and indentions 31, 33 if desired for further strength.

Figure 12:
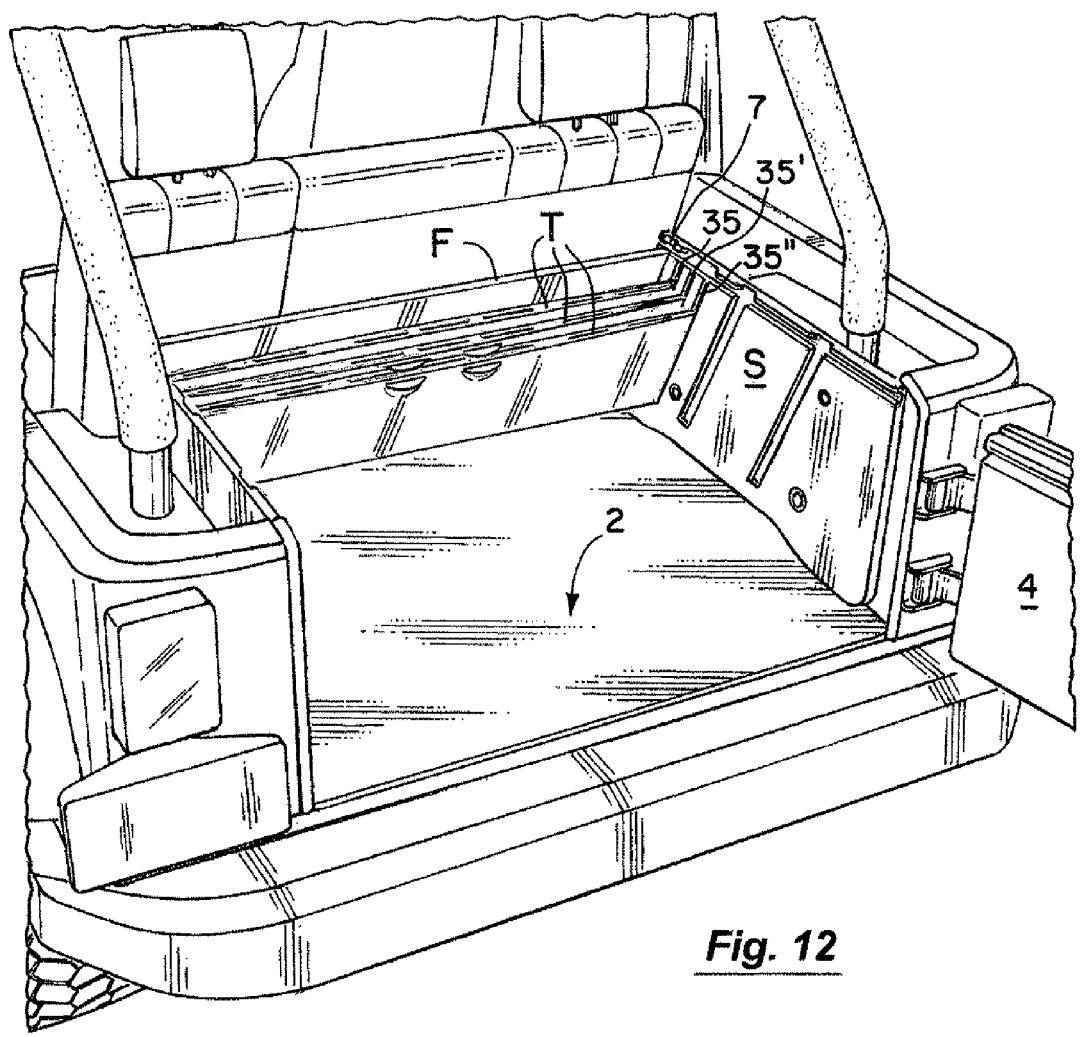
FIGS. 12 and 13 show the front and top panels in a stored configuration providing nearly full access to the rear deck of the vehicle.
Figure 13:
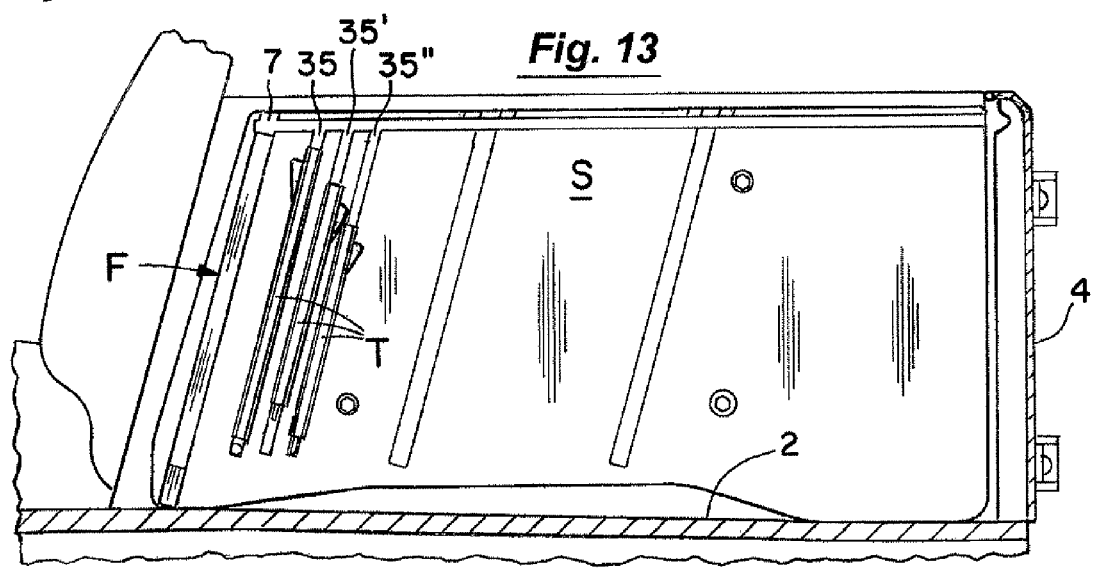

When not in a securing configuration as in FIGS. 6-8 or otherwise in use, the front and top panels F and T can be conveniently stored in the position of FIGS. 12 and 13. In this position, the front panel F is received in the front grooves 7 of the side panels S (FIG. 13) and the top panels T are located in the grooves 35, 35', and 35" of the side panels S immediately adjacent each other and the front grooves 7. The grooves 35, 35', and 35" could also be immediately adjacent and parallel to the grooves 7' and 7" if desired. Although three grooves 35, 35', and 35" are illustrated, there could be only one or two of them depending upon the number of top panels T.

Figure 14:
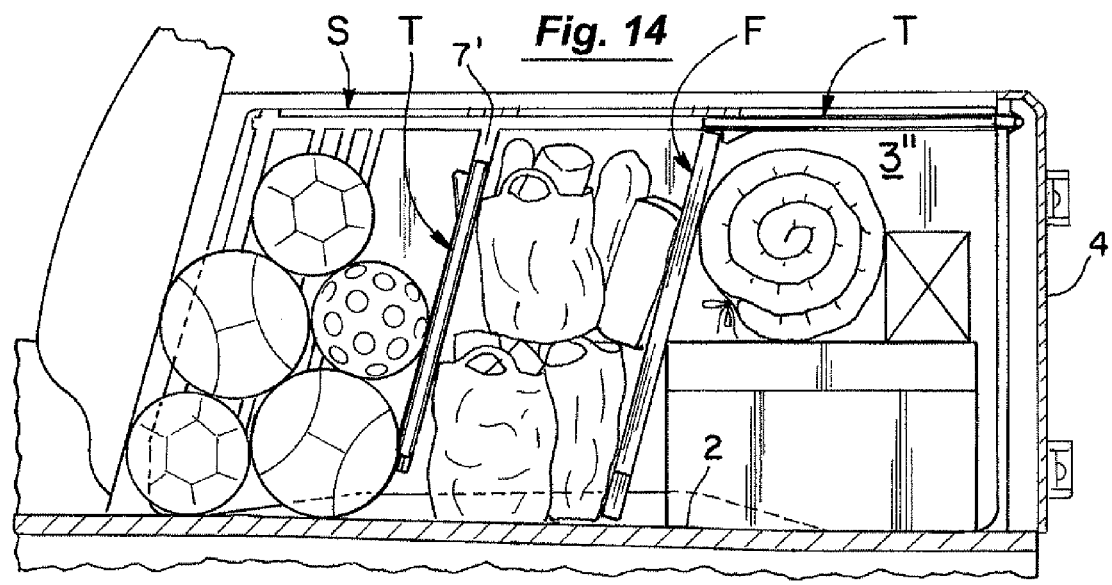
FIGS. 14-18 show other possible configurations of the front and top panels of the multi-positionable storage arrangement of the present invention.
Figure 15:
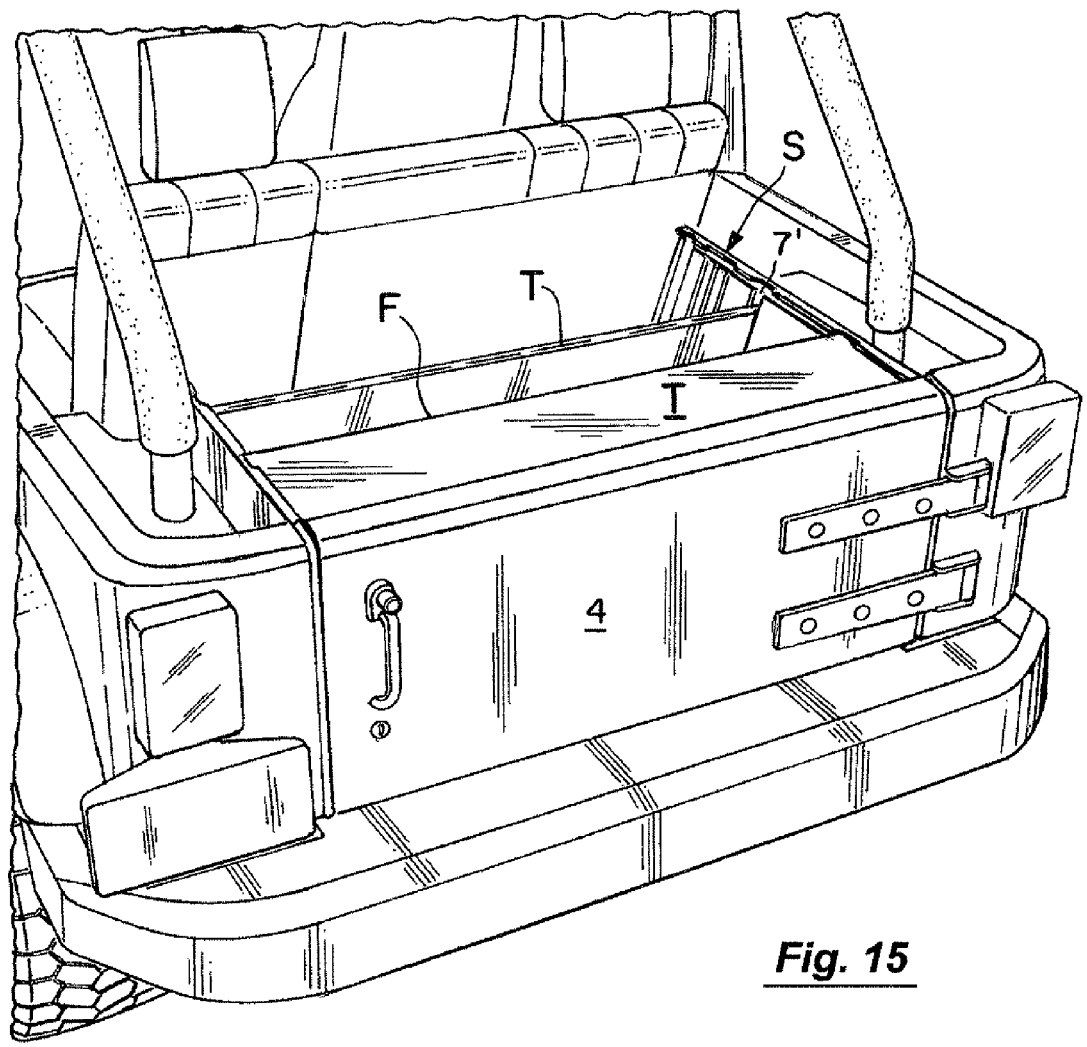
Figure 16:
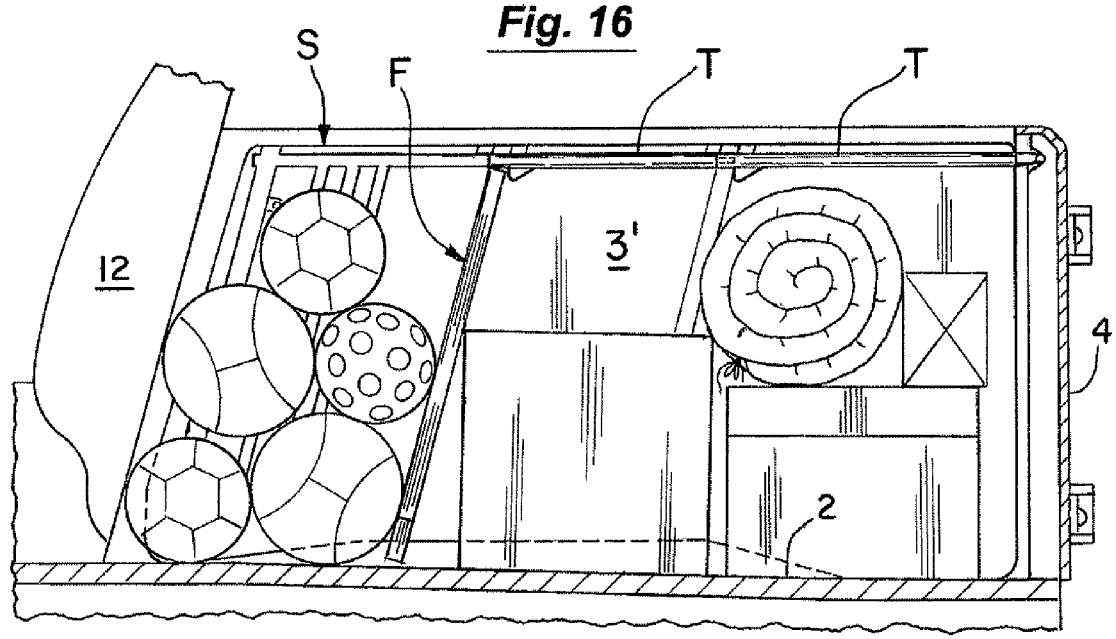
Figure 17:
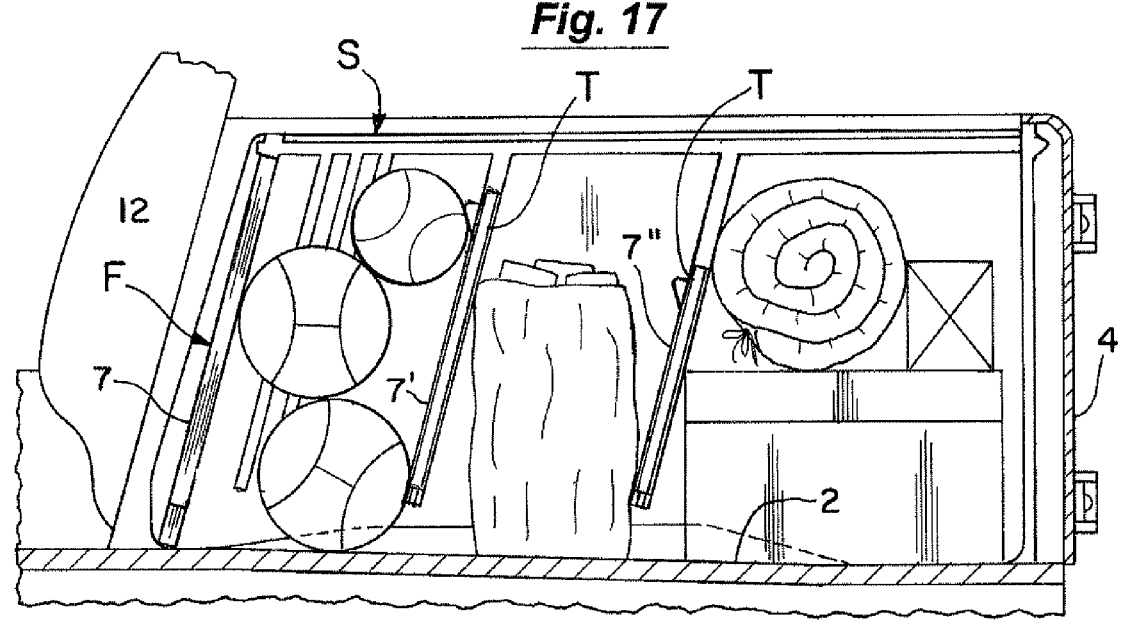
Figure 18:
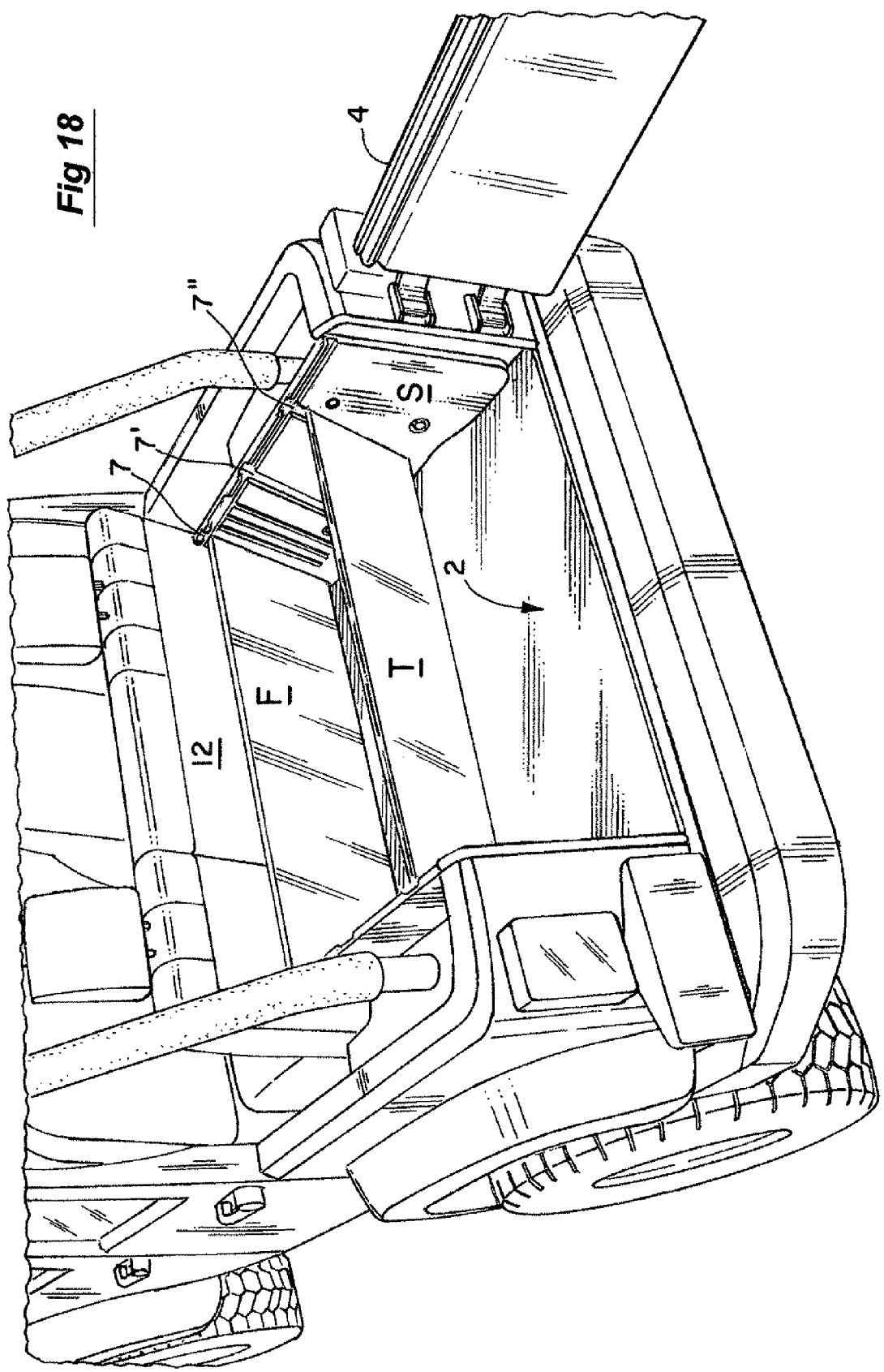

Other arrangements using the front and top panels F and T and offering both secured and open storage spaces can also be readily configured as desired as illustrated in FIGS. 14-18. In the configuration of FIGS. 14 and 15, the secured or enclosed space 311 of FIG. 8 is combined with the placement of one of the top panels T in the middle grooves 71 of the side panels S. The panel T in the middle grooves 71 in this configuration is preferably substantially parallel to the panel F (FIG. 14) and essentially serves as a divider between the open storage compartments forward of the secured space 311. The configuration of FIG. 16 offers the mid-sized secured space 3' of FIG. 7 with the front panel F and vehicle seat 12 forming an open storage compartment. In FIG. 17, the front panel F and two of the panels T are positioned as shown to form three open storage compartments. FIG. 18 illustrates yet another possible configuration with the front panel F in grooves 7 and a top panel T in the rear grooves 7" forming two similarly-sized, open storage compartments.

Figure 19:
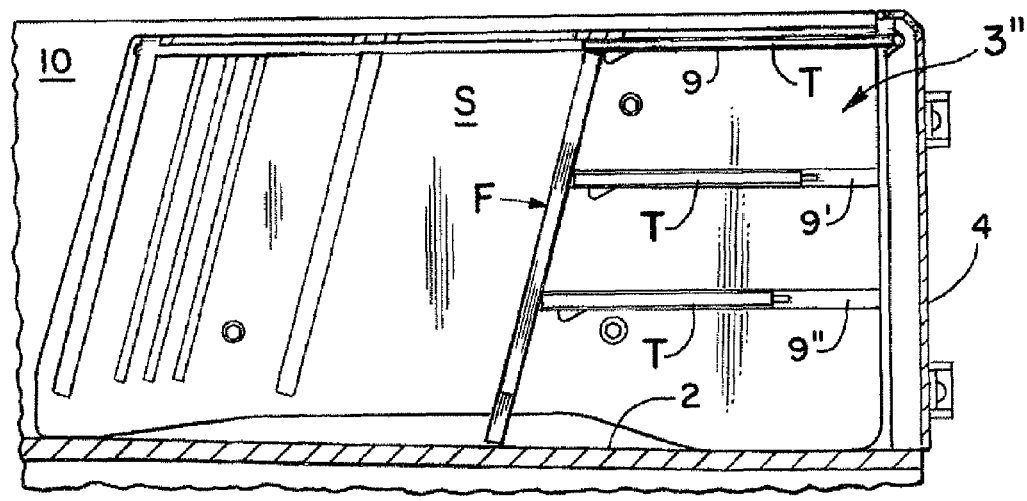
FIG. 19 illustrates a configuration in which two of the top panels are positioned within the securable storage space to form shelves.
Figure 20:
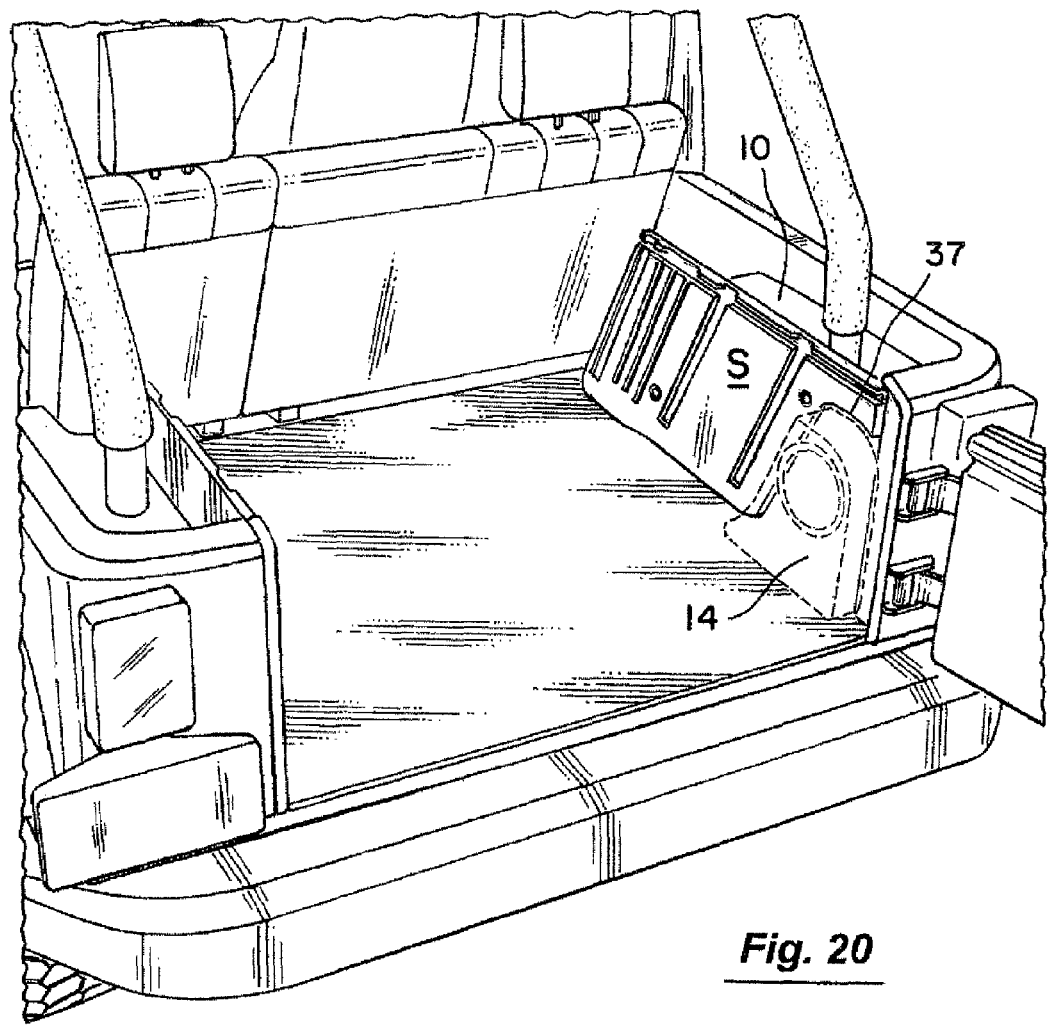
FIG. 20 is a rear perspective view showing a cutout that can be provided in a side panel to receive a speaker wherein the speaker would then be in the respective securable storage space of the configurations of FIGS. 6-8.

FIG. 19 shows an arrangement in which the side panels S are provided with second and third horizontal grooves 9' and 91" below the top grooves 9 in the storage space 311. Two of the top panels T can then be slid into the grooves 9' and 9" to form shelves within the secured space 3". Another adaptation of the present invention is to provide a cutout 37 in the side panel S of FIG. 20 to receive the speaker 14 that extend inwardly of the vehicle side wall 10. With this adaptation and in the configurations of FIGS. 6-8, the speaker 14 would be in the respective securable spaces 3, 3', and 311 when the tailgate 4 is closed.

The multi-positional storage arrangement of the present invention can be used with any number of vehicle models (e.g., sport utility, pickup truck) and regardless of whether the tailgate 4 pivots about a vertical axis as shown or a horizontal one.

In the illustrated arrangements, the vehicle 6 also has four doors and front and rear seats that are shown remaining in place in all of the configurations. In some configurations as in FIGS. 14-16, the rear seat 12 is even shown in place to aid in forming a storage space. However, the secured storage arrangements of FIGS. 6-8 in particular are equally adaptable to vehicles with just front seats or foldable and/or removable rear seats. As for example in the latter case, the configuration of FIG. 8 could be used with the rear seat in place, FIG. 7 with the rear seat folded forward, and FIG. 6 with the rear sear removed. Regardless of the vehicle model, the seat or seats as perhaps best illustrated in FIG. 17 are commonly inclined rearwardly from the vertical at a small acute angle (e.g., 10-20 degrees). The grooves 7 as well as the grooves 7' and 7" are preferably similarly inclined rearwardly toward the tailgate 4 to maximize the size of the spaces formed when a seat or seats are present.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A storage arrangement for a vehicle, the vehicle having a substantially horizontal rear deck, side walls spaced apart form each other and extending upwardly of the rear deck, and a tailgate mounted for pivotal movement between closed and open positions, said storage arrangement including:

at least two side panels respectively mounted to the side walls of the vehicle in substantially vertical positions extending upwardly from adjacent the rear deck, said side panels being horizontally spaced laterally apart from each other, each side panel having a first groove extending upwardly of the rear deck of the vehicle and a second groove extending substantially horizontally, said first and second grooves of the two panels being respectively, substantially aligned with each other across the rear deck, a front panel having upper, bottom, and side edges portions, said side edge portions being respectively slidably receivable in the aligned first grooves of the side panels to locate the front panel in a first position with the bottom edge portion thereof adjacent the rear deck of the vehicle and the front panel extending upwardly from adjacent the rear deck, at least one top panel having forward, rearward, and side edge portions, said side edge portions of said top panel being respectively slidably receivable in the aligned second grooves of the side panels, said top panel further having at least one stop member adjacent the forward edge portion thereof to stop said top panel in a first position with the side edge portions thereof received in said second grooves and with the forward edge portion of the top panel extending over the upper edge portion of the front panel to maintain the front panel in said first position thereof, said rear deck and side panels with said front and top panels in said respective first positions defining all walls of an enclosed storage space less one with the tailgate in said closed position defining the remaining wall of the enclosed storage space, said tailgate in said open position allowing access to said storage space and said tailgate in said closed position preventing access to said storage space.

2. The storage arrangement of claim 1 wherein said stop member depends downwardly with the top panel in said first position and abuts said front panel adjacent the upper edge portion thereof with said front panel and top panel in said respective first positions.

3. The storage arrangement of claim 2 wherein said stop member abuts said front panel substantially midway between the side edge portions of said front panel.

4. The storage arrangement of claim 1 wherein said tailgate in said closed position abuts the rearward edge portion of said top panel to secure said top panel in said first position with the forward edge portion of the top panel extending over the upper edge portion of the front panel and the depending stop member abutting the front panel.

5. The storage arrangement of claim 4 wherein the first grooves of said side panels and the side edge portions of the front panel form a first set and said second grooves of the side panels and the side edge portions of the top panel for a second set and wherein at least one of said first and second sets has interlocking members preventing said at least one of the front and top panels in the first position thereof from being removed laterally from between said side panels.

6. The storage arrangement of claim 5 wherein both of said first and second sets have interlocking members preventing both of said front and top panels in the respective first positions thereof from being removed laterally from between said side panels.

7. The storage arrangement of claim 1 wherein said top panel has a crowned upper surface extending laterally between said side edge portions thereof.

8. The storage arrangement of claim 1 wherein the vehicle has a speaker extending inwardly of at least one of the vehicle side walls and at least one of said side panels has a cutout therein to receive the speaker.

9. The storage arrangement of claim 1 wherein said first grooves extend upwardly at an acute angle to the vertical wherein said front panel in said first position is inclined rearwardly toward the tailgate.

10. The storage arrangement of claim 1 wherein the rearward edge portion of the top panel has a flexible seal extending therealong and abutting the tailgate with the tailgate in said closed position.

11. The storage arrangement of claim 1 wherein the front and top panels in the respective first positions form a first configuration and wherein each side panel has at least one other groove extending upwardly of the rear deck of the vehicle, said other grooves in said side panels being substantially aligned with each other across the rear deck and spaced from the aligned first grooves, said top panel being positionable in a second position with the side edge portions of the top panel received in the other grooves of the side panels.

12. The storage arrangement of claim 11 wherein the top panel in said second position is substantially parallel to the front panel.

13. A storage arrangement for a vehicle, the vehicle having a substantially horizontal rear deck, side walls spaced apart form each other and extending upwardly of the rear deck, and a tailgate mounted for pivotal movement between closed and open positions, said storage arrangement including:
   at least two side panels respectively mounted to the side walls of the vehicle in substantially vertical positions extending upwardly from adjacent the rear deck, said side panels being horizontally spaced laterally apart from each other, each side panel having a first groove extending upwardly of the rear deck of the vehicle and a second groove extending substantially horizontally, said first and second grooves of the two panels being respectively, substantially aligned with each other across the rear deck,
   a front panel having upper, bottom, and side edges portions, said side edge portions being respectively slidably receivable in the aligned first grooves of the side panels to locate the front panel in a first position with the bottom edge portion thereof adjacent the rear deck of the vehicle and the front panel extending upwardly from adjacent the rear deck,
   at least first and second top panels respectively having forward, rearward, and side edge portions, said side edge portions of said first and second top panels being respectively, slidably receivable in the aligned second grooves of said side panels, said first top panel further having at least one stop member adjacent the forward edge portion thereof to stop said first top panel in a first position and said front and top panels in a first configuration with the side edge portions of the first and second top panels received in said second grooves, said front edge portion of the first top panel extending over the upper edge portion of the front panel to maintain the front panel in the first position thereof, said rear deck and side panels with the front and top panels in said first configuration defining all walls of an enclosed storage space less one with the tailgate in said closed position defining the remaining wall of the enclosed storage space, said tailgate in said open position allowing access to said storage space and said tailgate in said closed position preventing access to said storage space.

14. The storage arrangement of claim 13 wherein said stop member depends downwardly with the first top panel in said first position and abuts said front panel adjacent the upper edge portion thereof with said front panel and said first top panel in said respective first positions.

15. The storage arrangement of claim 13 wherein the front edge portion of the second top panel abuts the rearward edge portion of the first top panel in said first configuration.

16. The storage arrangement of claim 13 wherein said tailgate in said closed position abuts the rear edge portion of the second top panel to secure the first top panel abutting said second top panel in said first configuration with the forward edge portion of the first top panel extending over the upper edge portion of the front panel.

17. The storage arrangement of claim 15 wherein the rearward edge portion of the first top panel and the forward edge portion of the abutting second top panel have at least one mating tongue and indention.

18. The storage arrangement of claim 13 wherein each side panel has at least one other groove extending upwardly of the rear deck of the vehicle, said other grooves in said side panels being substantially aligned with each other across the rear deck and spaced from the aligned first grooves, said front panel and one of said first and second top panels being positionable in a second configuration with the side edge portions of the front panel received in the other grooves of the side panels in a second position and the one of the first and second top panels received in the second grooves of the side panels with the forward edge portion of the one top panel extending over the upper edge portion of the front panel.

19. The storage arrangement of claim 18 wherein the side panels have additional grooves to slidably receive the side edge portions of the other top panel in a position extending upwardly of the rear deck and spaced from the front panel in said second configuration to form a storage compartment with said side panels, front panel, and the rear deck.

20. The storage arrangement of claim 19 wherein said front panel and other top panel are positioned substantially parallel to one another.

21. The storage arrangement of claim 13 wherein each side panel has at least two additional grooves extending upwardly from the rear deck of the vehicle, said additional grooves in said side panels being substantially aligned with each other across the rear deck and spaced from the aligned first grooves, said front panel and said first and second top panels being selectively positionable in another configuration with the front and top panels respectively in said first and two additional grooves.

22. The storage arrangement of claim 13 wherein each side panel has at least another substantially horizontal groove below the second grooves wherein the side edge portions of the other top panel with the one top panel in said second configuration are respectively received in the another grooves to form a shelf.

23. The storage arrangement of claim 13 further including a third top panel having forward, rearward, and side edge portions, said side edge portions of said third top panel being respectively, slidably receivable in the aligned second grooves of said side panels.

24. The storage arrangement of claim 23 wherein said side panels have at least three additional grooves extending upwardly from the rear deck of the vehicle, said additional grooves in said side panels being substantially aligned with each other across the rear deck and spaced from the aligned first grooves, said front panel and said first, second, and third panels being selectively positionable in another configuration with the front and top panels respectively in said first and three additional grooves.

25. The storage arrangement of claim 24 wherein said first and three additional grooves are immediately adjacent one another to compactly store said front and top panels in said another configuration.

26. A multi-positionable storage arrangement for a vehicle, the vehicle having a substantially horizontal rear deck, side walls spaced apart from each other, and a tailgate mounted for pivotal movement between closed and open positions, said multi-positional storage arrangement including:
   at least two side panels respectively mounted to the side walls of the vehicle in substantially vertical positions extending upwardly from adjacent he rear deck, said side panels being horizontally spaced laterally apart from each other, each side panel having a first groove extending upwardly from adjacent the rear deck of the vehicle, a second groove extending substantially horizontally, and a third groove spaced rearwardly of the first groove and extending upwardly from adjacent the rear deck of the vehicle, said first, second, and third grooves being respectively substantially aligned in sets with each other across the rear deck, a front panel having upper, bottom, and side edge portions, said side edge portions selectively, slidably receivable in one of the first and third sets of grooves of said side panels to locate the front panel in respective first and second positions with the bottom edge portion thereof adjacent the rear deck of the vehicle and the front panel extending upwardly from adjacent the rear deck, at least two top panels respectively having forward, rearward, and side edge portions, said side edge portions of said first and second top panels being selectively, slidably receivable in the aligned second and third grooves of the side panels to locate said top panels in respective first and second configurations wherein said top panels in said first configuration are received in said second grooves extending horizontally with the first top panel abutting the front panel in the first position of said front panel and with the forward edge portion of the second top panel abutting the rearward edge portion of the first panel and the rearward edge portion of the second panel adjacent the closed tailgate and wherein in said second configuration one of said two top panels is received in said second set of grooves extending horizontally with the one top panel abutting the front panel in the second position of the front panel with the rearward edge portion of the one top panel adjacent the closed tailgate and said other top panel in the second configuration received in the first set of grooves.

27. The multi-positionable storage arrangement of claim 26 wherein the forward edge portion of the first top panel in the first configuration and the one top panel in the second configuration extends over the upper edge portion of the front panel to maintain the front panel in the first position in the first configuration and in the second position in the second configuration.

28. The multi-positionable storage arrangement of claim 27 wherein the respective first and one top panel have at least one stop member adjacent the forward edge portion thereon to respective stop said first top panel in said first position of said first configuration and said one top panel in said second position in said second configuration.

29. The multi-positionable storage arrangement of claim 28 wherein said first and said one top panels are the same top panel.

30. The multi-positionable storage arrangement of claim 27 wherein said first and said one top panels are the same top panel.

31. The multi-positionable storage arrangement of claim 26 wherein said rear deck and side panels with the front and top panels in said first configuration define all walls of an enclosed storage space less one with the tailgate in said closed position defining the remaining wall of the enclosed storage space and wherein said rear deck and side panels with the front and one top panel in said second configuration define all walls of an enclosed storage space less one with the tailgate in said closed position defining the remaining wall of the enclosed storage space, said tailgate in both configurations in said open position allowing access to said storage space and said tailgate in said closed position preventing access to said storage space.

32. The multi-positionable storage arrangement of claim 26 further including a third top panel and wherein each side panel includes a fourth groove forming an aligned fourth set across the rear deck spaced from and substantially parallel to the first set of grooves wherein said first, second, and third top panels are positionable in a third configuration with the first, second, and third top panels received in the second set of grooves of the side panels with the forward most top panel abutting the front panel positioned in said fourth set of grooves and the rearward edge portion of the rearward most top panel adjacent the closed tailgate.

33. The multi-positionable storage arrangement of claim 32 wherein said top panels are positionable in a fourth configuration with two of the top panels respectively received in two of the first, third, and fourth sets of grooves and said front panel received in the remaining set of said first, third, and fourth set of grooves.

34. The multi-positionable storage arrangement of claim 26 further including at least fourth and fifth aligned sets of grooves in said side panels immediately adjacent the first set of grooves and substantially parallel thereto to receive said top panels in another configuration with the top panels in two of the first, fourth, and fifth sets of grooves and the front panel in the remaining set of said first, fourth, and fifth sets of grooves with the front and top panels substantially parallel to each other.

* * * * *